Feb. 26, 1957 H. GÜNTHER 2,783,359
PROCESS FOR ARC WELDING OF CIRCULAR SEAMS ON
PIPES IN SUBSTANTIALLY HORIZONTAL POSITION
Filed March 9, 1954 2 Sheets-Sheet 1

INVENTOR
Hans Günther
by Armand E. Mestern
Attorney

Feb. 26, 1957  H. GÜNTHER  2,783,359
PROCESS FOR ARC WELDING OF CIRCULAR SEAMS ON
PIPES IN SUBSTANTIALLY HORIZONTAL POSITION
Filed March 9, 1954  2 Sheets-Sheet 2
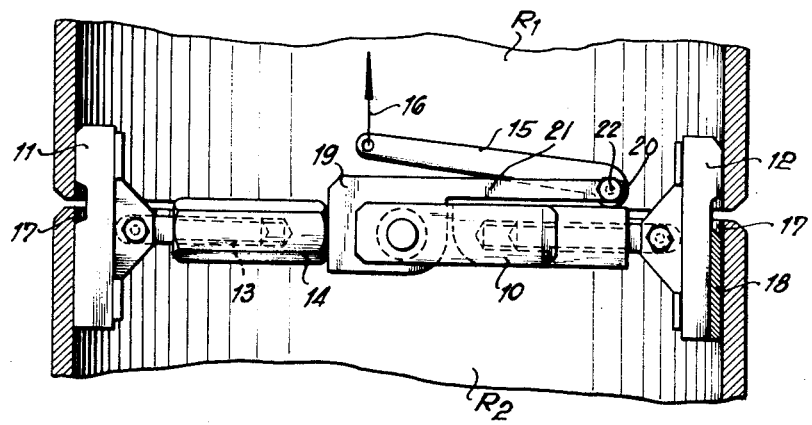
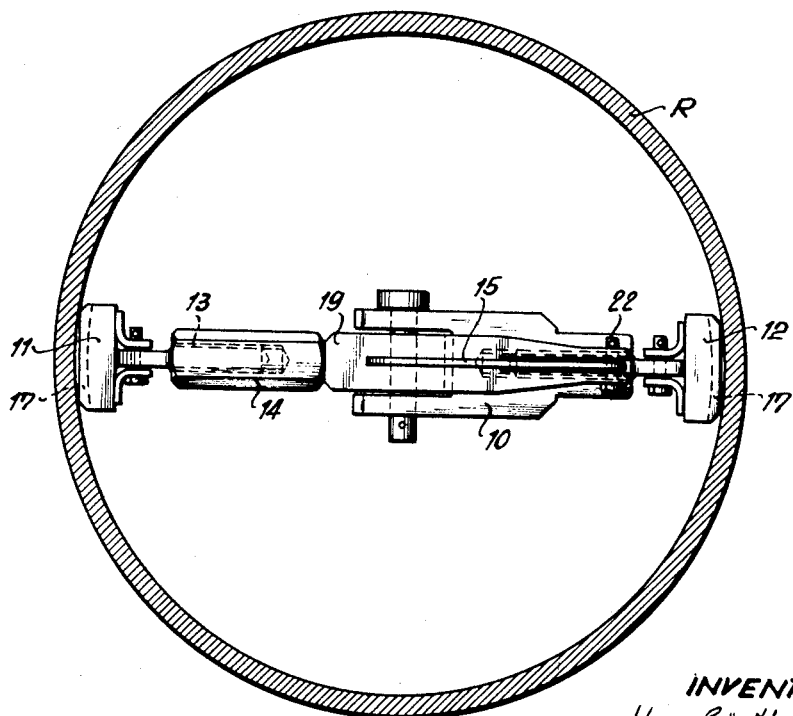
INVENTOR
Hans Günther
by Armand E. Mystery
Attorney United States Patent Office 2,783,359
Patented Feb. 26, 1957

2,783,359

PROCESS FOR ARC WELDING OF CIRCULAR SEAMS ON PIPES IN SUBSTANTIALLY HORIZONTAL POSITION

Hans Günther, Mosbach (Baden), Germany, assignor to Kraftanlagen A. G., Heidelberg, Germany Application March 9, 1954, Serial No. 415,117

Claims priority, application Germany March 10, 1953

5 Claims. (Cl. 219—61)

The present invention relates to a process and a device for manually or automatically arc welding of root-welds on circular seams in pipes not free to rotate laid substantially horizontal, with gap or axial spacing. Welding of such circular seams without applying backing elements or strips is known to present difficulty because the several parts of the seam are at different angles to the vertical, i. e., to the direction of gravity, so that the arc, in progressing along the seam, encounters continually changing conditions by supporting flux and molten material, with the result that the weld bead becomes irregular. If, as is usually the case, the weld is made from the outside, then the welding position will be normal at the top, i. e. there will be an approximately horizontal joint, to be welded from above. In its further course, the joint passes over into vertical position at the side, and then into overhead position, returning through vertical position on the other side and back to normal position. In normal and overhead positions, only a small width of gap is permissible, because the fused material will tend to drop through somewhat, so that if the gap is too wide, the connection will be broken and the edges of the weld fail to close, or inwardly projecting obstrusions will occur in case of normal position. In vertical joints, on the other hand, the fused material is supported by the upward-directed arc. This makes it possible to bridge wider seams, and there is therefore more available latitude in the width of the gap. When such welds are made with the familiar and widely used heavily coated electrodes, then in normal and overhead position the joints must have initial axial spacings up to only about 1.5 mm. (1/16"), while on vertical joints the gaps may have widths from about 1.5 to 3 mm. (1/16" to 1/8").

The present invention is based on a recognition of these factors, and discloses a simple method of meeting the existing requirements, allowing for varying welding conditions, and thereby securing a uniform and perfect weld, without any backing up to the root. The process for arc welding circular seams on pipes in substantially horizontal position, according to the invention, consists in that the two ends of pipe to be welded together are elastically and temporarily so deformed as to assume a cross-section approximating an ellipse with horizontal major axis. This deformation may be accomplished in either of two ways. The two juxtaposed pipe ends may be vertically compressed somewhat from the outside, or they may be horizontally expanded from the inside. Either method produces the desired shape of a horizontal ellipse. Such deformation causes the edges of the pipe ends, originally situated in planes perpendicular to the centerline, to be transformed into space curves, namely in such manner that they will be slightly farther apart at the right and left than at the top and bottom. Under this strain, the seam is then welded, the back-weld being usually sufficient, whereupon, when the joint has thus been closed, the deforming means can be removed.

The deforming means according to the invention simultaneously center the pipe ends accurately and hold them in axial position, so that the conventional tack welding, which is troublesome and interferes with uniformity of the weld, can be omitted.

Some embodiments of devices for practicing the idea of the invention are represented in the accompanying drawing, wherein:

Fig. 3 is a horizontal section, and Fig. 4 a vertical section, through the two juxtaposed pipe ends near the circular seam, showing an embodiment in which the two pipe ends are expanded horizontally from the inside.

Figure 1:
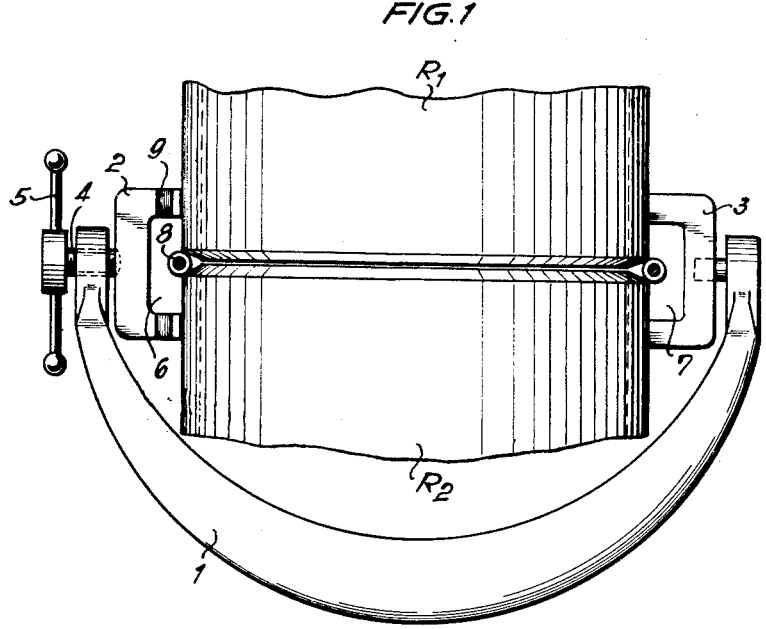
Fig. 1 is a horizontal section.
Figure 2:
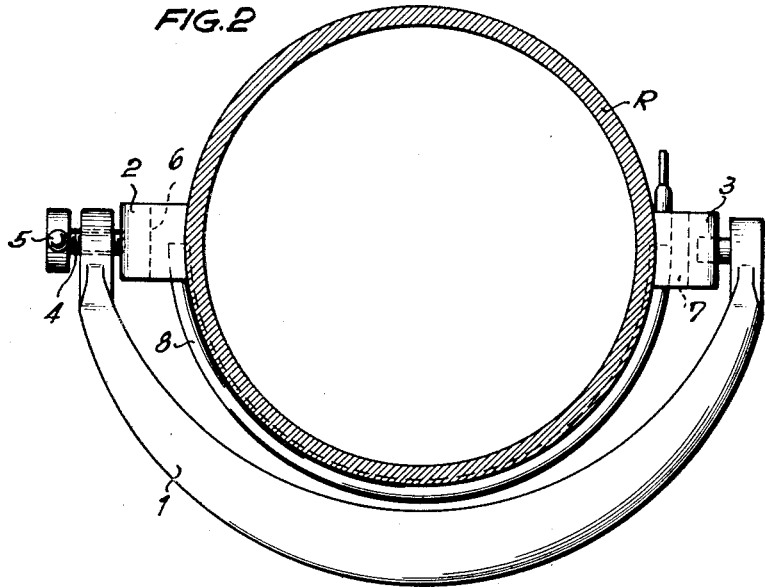
Fig. 2 is a vertical section, through the two juxtaposed pipe ends near the circular seam, showing an embodiment in which the two pipe ends are compressed vertically from the outside.

The embodiment in Figs. 1 and 2, serving to weld the two pipe ends $R_1$ and $R_2$ together, comprises a clamping bow 1 provided at the ends with feet 2 and 3 resting on the pipe ends. One of these two feet, namely foot 2, can be adjusted in radial direction by means of a screw 4 bearing a handle 5, thereby applying pressure to the walls of the pipe from the outside. The bow 1 is rotatably connected with the feet 2 and 3, so that it will swing aside. As Fig. 1 shows, the weld is freely accessible with the bow swung aside, so that work on the joint is not obstructed by the device. The two feet 2 and 3 do not rest solidly on the pipe ends, but are provided with recesses 6 and 7 to leave sufficient room for insertion of the coated electrode 8. Other means required for the welding operation itself have not been explicitly shown. These include for example a cover plate to be placed on the electrode, or other means for holding the electrode in place, and optionally, magnetic devices serving to produce auxiliary magnetic fields to control the arc, or the like. In any case, the recesses 6 and 7 may readily be made such as to leave ample room for all the required welding means, so that in this respect also, the device will not obstruct the welding operation in any way.

The feet 2 and 3, for mechanical reasons, are preferably of steel. To reduce magnetic interference, the feet may be provided with pads, or, as shown in the case of foot 2, in sectional view, inserts 9 of non-magnetic material, for example copper or aluminum. It may of course suffice to provide such a non-magnetic layer 9 in only one of the two legs of the U-shaped cross-section of the feet.

The embodiment in Figs. 3 and 4 effects the deformation by radial pressure from the inside. In this case the welding seam is completely accessible from the outside throughout its length. In this embodiment, the deforming means 10 is a toggle, again provided at the ends with shoes 11 and 12. In operating position the toggle is locked just beyond dead center, the corresponding thrust being counteracted by an eccentric 20 of lever 15 engaging with part 10, as shown in Fig. 3. In such embodiments also, at least one of the two shoes is made radially adjustable. Thus in the embodiment shown, shoe 11 is mounted on a bolt 13 enclosed by the thread of a nut 14 rotatably attached to the toggle 10. If this nut 14 is turned, for example with the aid of a wrench, foot 11 can thereby be adjusted in radial direction and caused to apply pressure to the inside of the pipe ends. In the embodiment shown, the other shoe 12 is likewise adjustably mounted by means of a similar bolt. This permits adaptation of the device to various pipe diameters.

In this embodiment, again, the shoes 11 and 12 have recesses 17 at the joint to be welded. However, these recesses need not be very large, as they serve merely to allow for unobstructed formation of the back-weld and provide flow clearance for molten material and flux. In this variant also, possible magnetic interference is reduced by providing the shoes 11 and 12 with pads 18 of non-magnetic material. This is represented in Fig. 3 for shoe 12, where—in departure from Fig. 1—only one of the two surfaces in contact with the pipe wall is provided with such a pad 18, by way of exemplification of this alternative possibility.

In the case of this embodiment, the procedure is as follows: The device is first introduced into one of the pipe ends, fixed beyond dead point, and drawn up by turning the nut 14 until that pipe end has been expanded in horizontal direction so as to assume the desired elliptical form. Then the other pipe end, by means of an externally acting deforming means of any type, for example substantially resembling that of Figs. 1 and 2, is compressed in vertical direction so as likewise to assume elliptical form and readily slip over the shoes 11 and 12 of the braced toggle. Then the external deforming means is removed from the second pipe end, whereafter both pipe ends are firmly and securely held by the internal device. After completion of the weld, or at least of the root-weld, the internal device is also removed. This is done by pulling the cord 16, which has been passed through the pipe as far as its freely accessible end. By pulling the cord 16 in direction of the center line of the pipe, the lever 15 which is pivotally connected to an arm 21 of part 19 by a pin 22 will overcome dead point resistance by action of eccentric 20 on part 10 and thus open the toggle. The device collapses, and the whole can then be drawn out to the free end of the pipe by the same cord 16.

Thus it is seen that the process according to the invention makes it possible to adapt the gap width of the weld to the requirements. The extent of deformation may optionally be so chosen that the gap varies in width to the requisite extent throughout the circuit of the weld. The proper adjustment of the device is readily ascertained empirically by measuring the pipe expansion in horizontal direction.

The essential idea of the invention is of value for back-root welds of all kinds, since in all cases a local variation in slope of the joint affects the welding operation and thereby determines the optimum width of gap at the point in question. However, the method is of special value in automatic electric arc welding with fixedly inserted electrode, for when welding by hand there is in any case some freedom of adaptation to variations in conditions due to geometrical position and action of gravity. For this reason, such welds with fixedly inserted electrodes have been chosen for the purpose of describing embodiments of the invention.

What I claim is:

1. In the process of joining two stationary circular pipe sections by arc welding their rims, the rims being positioned to form a substantially annular gap extending in a vertical plane, the steps of deforming elastically and temporarily the rims to form a gap which is wider at the sides than at top and bottom, and causing the welding arc to progress along the unequal-width gap while the pipe sections remain stationary.

2. In the process as claimed in claim 1, in which the deformation is obtained by elastically and temporarily forcing the substantially circular adjacent end sections of the pipes to assume a substantially elliptical cross-section with a horizontal major axis and a vertical minor axis.

3. In the process of joining two stationary circular pipe sections by arc welding their rims, the rims being positioned to form a substantially annular gap extending in a vertical plane, the steps of engaging the two rims by adjustable means bridging the gap therebetween, adjusting said means to elastically force said rims to form a gap which is wider at the sides than at top and bottom, causing the welding arc to progress along the unequal width gap while the pipe sections remain stationary, and removing said adjustable means.

4. The process as claimed in claim 3, in which said adjustable means engage the interior of the pipe rims at two diametrically opposite sections in the vicitnity of the horizontal diameter of the rims, and said means are adjusted to expand in the direction of the diameter.

5. The process as claimed in claim 3, in which said adjustable means have spaced projections engaging the exterior of the pipe rims at two diametrically opposite sections in the vicinity of the vertical diameter of the rims, and said means are adjusted to contract in the direction of the diameter.

References Cited in the file of this patent

UNITED STATES PATENTS

| | | |
|---|---|---|
| 1,179,919 | Heggie | Apr. 18, 1916 |
| 1,323,556 | Smith | Dec. 2, 1919 |
| 1,435,679 | Young | Nov. 14, 1922 |
| 1,566,674 | Horta | Dec. 22, 1925 |
| 1,604,543 | Wilson | Oct. 26, 1926 |
| 1,642,825 | Pearce | Sept. 20, 1927 |
| 1,696,455 | Rupley | Dec. 25, 1928 |
| 1,964,926 | Moss | July 3, 1934 |
| 2,653,208 | Ballman | Sept. 22, 1953 |

FOREIGN PATENTS

| | | |
|---|---|---|
| 549,983 | Great Britain | Dec. 17, 1942 |